Patented Feb. 5, 1952

2,584,935

UNITED STATES PATENT OFFICE 2,584,935

UNSYMMETRICAL DISAZO DYESTUFFS

Albert F. Strobel, Phillipsburg, N. J., and William W. Williams, Easton, Pa., assignors to General Aniline & Film Corporation, New York, N. Y., a corporation of New York No Drawing. Application February 4, 1949, Serial No. 74,704

6 Claims. (Cl. 260—175)

This invention relates to novel unsymmetrical disazo diphenylurea dyestuffs, and a method for preparing the same.

It is an object of this invention to provide dyes yielding direct dyeings on cellulosic fiber, especially cotton, from alkaline to neutral dyebaths, and which upon treatment on the fiber with lake-forming metal salts, especially copper salts, yield colorations of excellent fastness to washing and light.

The dyestuffs mentioned are prepared by coupling tetrazotized 4,4'-diamino-3,3'-dicarboxy-diphenylurea or -thiourea with one molecular equivalent of each of two different acetoacetanilides, one containing a sulfo group in the anilide nucleus and the other containing no water-solubilizing nuclear substituents. Either or both of the acetoacetanilides may contain non-water-solubilizing substituents in the anilide nucleus, particularly halogen, nitro, alkyl, alkoxy, acetamino, carboxyalkyl or aliphatic acyl (i. e., keto) groups.

The resulting dyestuffs, in the form of their free acids, have the following formula:

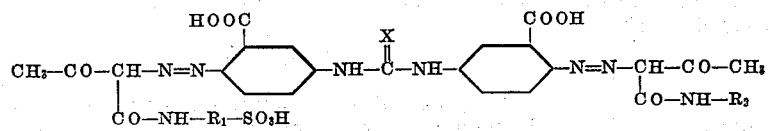

wherein X represents a member of the group consisting of O and S, $R_1$—$SO_3H$ represents a sulfophenyl radical containing no additional water-solubilizing substituents (such as sulfo, carboxy, amino or hydroxyl groups), and $R_2$ represents a phenyl radical containing no water-solubilizing substituents of the aforesaid type.

The preferred dyestuffs of this invention are those having in free acid form the following formula:

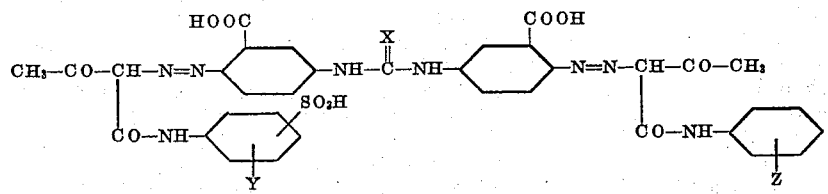

wherein X has the same significance as given above, and Y and Z represent members of the group consisting of hydrogen, halogen, nitro, alkyl (methyl, ethyl), alkoxy (methoxy, ethoxy), acetamino, carboxyalkyl (carboxymethyl, carboxyethyl) and aliphatic acyl ($CH_3CO$—) groups.

In preparing the dyestuffs of this invention, it is desirable to avoid coupling of the tetrazotized 4,4'-diamino-3,3'-dicarboxy-diphenylurea or -thiourea with the non-sulfoacetoacetanilide before coupling occurs with the sulfoacetoacetanilide, since the insolubility of the diazo-azo compound formed by initial coupling of the tetrazo compound with the non-sulfo substituted acetoacetanilide interferes with complete coupling of the diazo-azo compound to form the desired disazo compound. Thus, preparation of the present dyestuffs can be carried out satisfactorily by adding the tetrazo compound to a mixture (e. g. an aqueous alkaline solution) containing approximately equimolecular amounts of the sulfoacetoacetanilide and the non-sulfoacetoacetanilide, respectively, or by first coupling the tetrazo compound with about one molecular equivalent of the sulfoacetoacetanilide and then coupling the diazo-azo compound with a molecular equivalent of the non-sulfoacetoacetanilide. The disazo dyestuff thus formed can be readily recovered from the reaction mixture in the form of a filter cake.

In order to prepare a dyestuff composition having the desired solubility in water, the filter cake is acidified with a volatile organic acid, particularly acetic acid, and dried by heating under reduced pressure (e. g. at temperatures from 65–75° C.). Upon grinding the dried dyestuff to a powder and standardizing with diluents, especially alkaline-reacting salts such as sodium carbonate and disodium phosphate, dyestuff powders are obtained having excellent solubility in water for dyeing purposes.

The dyestuffs of this invention are applied for dyeing cellulosic fiber or textile material such as cotton or regenerated cellulose, directly in aqueous neutral to alkaline dyebaths. The dyed material is preferably after-treated with a lake-forming metal salt, especially a copper salt such as copper sulfate, whereby optimum fastness properties are obtained. The dyestuffs yield yellow to orange to brown shades in the aforesaid dyeing processes. The present dyestuffs are especially adapted for dyeing the cellulosic component of mixed fabrics of cellulosic fiber and organic derivatives of cellulose (e. g. cellulose acetate), since the dyestuffs of this invention leave the organic derivative of cellulose material unstained. In addition, the colorations produced on cellulosic fiber, when after-treated with copper salts, yield a clear alkaline discharge, for example, with alkaline hydrosulfite discharge compositions.

It was known heretofore to prepare asymmetrical disazo dyestuffs from tetrazotized 4,4'-diamino-3,3'-dicarboxy-diphenylurea or -thiourea, by coupling with two different acetoacetanilides both of which, however, contain a sulfo group. For example, one of the dyestuffs, heretofore employed in commercial dyeing, is obtained by coupling tetrazotized 4,4'-diamino-3,3'-dicarboxy-diphenylurea with one molecular equivalent of 4-sulfoacetoacetanilide and one molecular equivalent of 2-chloro-5-sulfoacetoacetanilide, the resulting dyestuff yielding yellow shades on cotton, particularly when after-treated with copper sulfate. As compared with this dyestuff, the dyestuffs of the present invention are equally soluble in aqueous alkaline to neutral dyebaths, despite the fact that they contain only one rather than two sulfo groups. In dyeing cellulosic fibers such as cotton, the dyestuffs of this invention exhaust more rapidly and more fully from alkaline to neutral dyebaths than the disulfo dyestuff of the prior art, indicating superior substantivity for cellulosic materials. When after-treated on the fiber with a copper salt, the dyestuffs of this invention yield colorations which are brighter in shade and which have superior fastness to washing with aqueous soap or soda ash solutions as compared with the corresponding colorations produced with the aforesaid disulfo disazo dyestuff. The coloration produced by coppering the aforesaid disulfonated disazo dyestuff on cellulosic fiber leaves a yellow stain when treated with an alkaline discharge, whereas the colorations similarly produced by after-coppering the dyestuffs of this invention yield a perfectly clear discharge.

Preparation of a number of preferred dyestuffs of this invention is illustrated in the following examples, wherein parts and percentages are by weight unless otherwise indicated, parts by volume signifying the volume of an equal number of parts by weight of water.

*Example 1*

27.25 parts of 4,4'-diamino-3,3'-dicarboxy-diphenylurea in the form of a 5% aqueous paste are dissolved in a mixture of 30 parts by volume of 50% aqueous caustic soda and 350 parts of water. 114 parts by volume of 10% aqueous sodium nitrite are added, and the resulting solution is cooled to 0–10° C. The solution is added in a fine stream to a thoroughly agitated mixture of 75 parts by volume of concentrated hydrochloric acid with 200 parts of ice; the final temperature of the mixture being about 8° C. Agitation is continued for one-half hour while cooling to maintain a temperature of 0–5° C. A coupling solution is prepared by dissolving 14.2 parts of acetoacetanilide and 34.9 parts of a 72% aqueous paste of 4-sulfo-2-chloroacetoacetanilide in a mixture of 100 parts of water and 25 parts by volume of 40% sodium hydroxide. 25 parts of sodium bicarbonate are added, whereby the acetoacetanilide is precipitated, and then 530 parts by volume of 20% aqueous sodium carbonate are added and the resulting solution is cooled to 0–5° C. The tetrazo solution, first prepared, is added portionwise over a period of about one hour to the coupling solution while maintaining the temperature at 0–5° C. The coupling mixture yields a negative test for diazo compounds when treated with H-acid about one minute after the addition of each portion of the tetrazo solution. When all of the tetrazo solution has been added, the resulting slurry is agitated for two hours at 5° C., and then filtered to recover the dyestuff. The filter cake is slurried with an equal amount of water until a homogeneous mixture is formed, and the paste is neutralized by adding 25 parts by volume of glacial acetic acid and acidified by adding an additional 25 parts by volume of glacial acetic acid. The paste is filtered and the filter cake washed with 200 parts of water and dried in a vacuum oven for 36 hours at 70° C. The dried filter cake is ground to a powder in a hammer-mill, the yield being 111.6 parts. For standardization, 79 parts of the resulting dyestuff powder is mixed in a ball-mill with 50 parts of sodium carbonate, 25 parts of disodium phosphate, and 2 parts of Nekal BX (an alkylated naphthalene sulfonate wetting agent). The resulting dyestuff composition has good solubility in water, dyeing cotton yellow shades from aqueous alkaline to neutral dyebaths, which, upon after-treatment with aqueous copper sulfate, acquire excellent fastness to washing. The resulting dyestuff produces no stain on cellulose acetate material. The coloration produced by coppering the dyestuff of this example on cotton possesses superior brilliance of shade and fastness to washing as compared with a dyestuff obtained by coupling the same tetrazo compound on the one hand with p-sulfoacetoacetanilide and on the other hand with 2-chloro-5-sulfoacetoacetanilide. The coloration produced by coppering the dyestuff of this example on cotton fiber yields a clear discharge when treated with an alkaline hydrosulfite composition, while the aforesaid commercial dyestuff leaves a yellow stain on similar discharge treatment. The dyestuff of this example further has similar solubility in aqueous alkaline to neutral dyebaths as compared with the aforesaid disulfo dyestuff, and exhausts more rapidly and more fully on cotton than the aforesaid commercial dyestuff.

*Example 2*

7.34 parts of 4,4'-diamino-3,3'-dicarboxy-diphenylurea in the form of a 5% aqueous paste is rendered alkaline by mixing with 15 parts by volume of 40% aqueous caustic soda, whereupon 30.7 parts by volume of 10% aqueous sodium nitrite are added to the mixture. The resulting solution is gradually poured (in about 20 minutes) into a mixture of 25 parts by volume of concentrated hydrochloric acid with 150 parts of ice. After agitating for 15 minutes, the resulting slurry is filtered, and the tetrazo filter cake is thoroughly mixed with 6.36 parts of 5-sulfo-2-methoxy-acetoacetanilide. 30 parts of sodium bicarbonate are added with thorough agitation and the mixture is kneaded for 2 hours. 4.25 parts of acetoacetanilide are incorporated with the mixture by thorough kneading. 11 parts by volume of 40% aqueous sodium hydroxide are worked into the resulting paste, and after kneading for one hour, the product is slurried with 200 parts of water acidified with 25 parts by volume of glacial acetic acid. The resulting slurry is filtered, and the filter cake is dried under reduced pressure in a vacuum oven at about 70° C. Standardization is carried out in the same manner as in Example 1. The resulting dyestuff has solubility and exhaust properties on cotton similar to those possessed by the dyestuff of Example 1, and yields yellow shades on cotton which, after coppering with copper sulfate, have outstanding fastness to washing and light. The resulting dyestuff, like the product of Example 1, is characterized by the absence of staining effect towards cellulose acetate materials, and after coppering with a copper sulfate solution on the fiber, yields a clear alkaline discharge.

*Example 3*

A disazo dyestuff is prepared in the same manner as in Example 1, except that instead of 4-sulfo-2-chloroacetoacetanilide and acetoacetanilide itself, equivalent amounts of 4-sulfo-2-methoxy-acetoacetanilide and of 2-chloroacetoacetanilide are respectively employed. A yellow dyestuff yielding brilliant colorations on cellulosic fiber directly from aqueous to alkaline dyebaths which are slightly redder than those produced with the dyestuff of Example 1, and having similar dyeing and fastness properties to those of the product of Example 1, is obtained.

In each of the foregoing examples, 4,4'-diamino-3,3'-dicarboxy-diphenyl-thiourea can be substituted for the corresponding urea employed as the tetrazo compound, whereby dyestuffs having similar color and fastness properties are obtained.

Instead of the acetoacetanilides of the examples, other acetoacetanilides can be used. Thus, acetoacetanilides containing no sulfonic acid or other water-solubilizing groups can be prepared by reacting acetoacetic acid ethyl ester or diketene in a solvent such as benzene with aniline or unsulfonated nuclear substitution products thereof which contain no water-solubilizing groups. The resulting products, suitable as coupling components in preparing the dyestuffs of this invention, are for example, the acetoacetyl derivatives of the following amines:

aniline
2-chloroaniline
2-methyl-3-chloroaniline
o-toluidine
p-nitraniline
p- or m-amino-acetophenone
p-bromoaniline
2,4-xylidine
o-anisidine
p-amino-ethyl-benzoate
m-amino-methyl-benzoate
p-amino-acetanilide Nuclear sulfo substituted acetoacetanilides employed as the other coupling component for preparing the dyestuffs of this invention are best prepared by reacting diketene with the corresponding sulfonated aniline. Sulfoacetoacetanilides which are suitable for use as coupling components in making the dyestuffs of this invention are the acetoacetyl derivatives of the following sulfonated aniline compounds:

sulfanilic acid
orthanilic acid
5-sulfo-o-anisidine
5-sulfo-2-chloroaniline
2-sulfo-3-chloroaniline
2-sulfo-4-chloroaniline
2-sulfo-4-bromoaniline
6-sulfo-3-nitraniline
3-sulfo-4-chloroanisidine
4-sulfo-2-nitraniline
2-sulfo-4-acetaminoaniline
3-sulfo-p-toluidine
2-sulfo-5-nitro-p-toluidine
p-sulfo-o-toluidine
2-sulfo-5-chloro-p-anisidine
3-sulfo-p-phenetidine As indicated above, it is important in preparing the disazo dyestuffs of the invention that the coupling be carried out under conditions preventing coupling of the tetrazotized diamino-dicarboxy-diphenylurea with the unsulfonated acetoacetanilide before coupling occurs with the sulfo substituted acetoacetanilide. Suitable conditions for obtaining the desired coupling with 1 mol each of the two acetoacetanilide compounds are illustrated in the examples, wherein the tetrazo compound is added progressively to a solution of both coupling components, or wherein the tetrazo compound is first added to the sulfo-acetoacetanilide and the intermediate diazo-azo compound thereby formed is then coupled with the non-sulfoacetoacetanilide.

Variations and modifications which will be obvious to those skilled in the art can be made in the foregoing processes and products without departing from the scope or spirit of the invention.

We claim:

1. An unsymmetrical disazo dyestuff having, in the form of its free acid, the following formula:

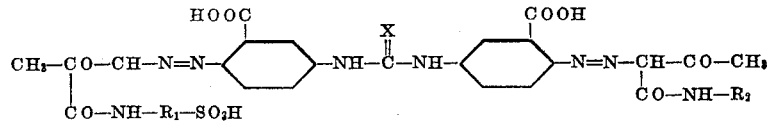

wherein X represents a member of the group consisting of oxygen and sulfur, $R_1$—$SO_3H$ is a sulfophenyl radical containing no additional water-solubilizing substituents, and $R_2$ is a phenyl radical containing no water-solubilizing substituents.

2. An unsymmetrical disazo dyestuff having, in the form of its free acid, the following formula:

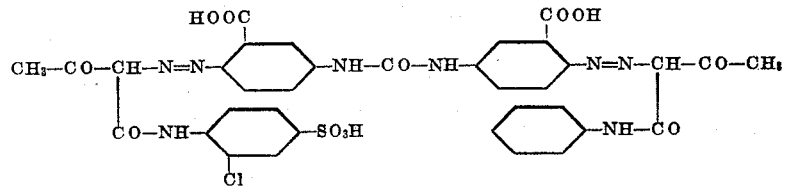

3. An unsymmetrical disazo dyestuff having, in the form of its free acid, the following formula:

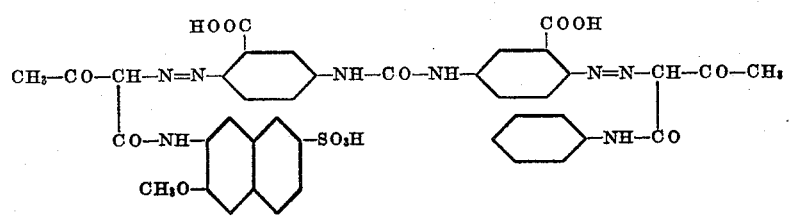

4. An unsymmetrical disazo dyestuff having, in the form of its free acid, the following formula:

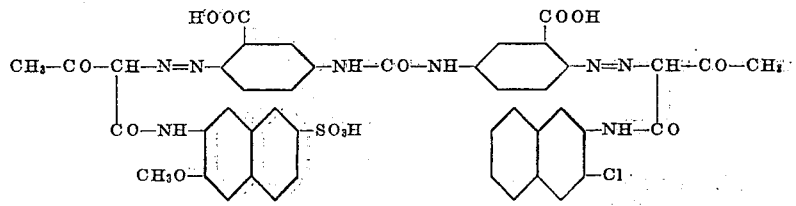

5. Process of preparing an unsymmetrical disazo dyestuff, which comprises coupling a member of the group consisting of tetrazotized 4,4'-diamino-3,3'-dicarboxy-diphenylurea and tetrazotized 4,4'-diamino-3,3' - dicarboxy - diphenylthiourea with one molecular equivalent of an acetoacetanilide containing a nuclear sulfo group but no additional water-solubilizing substituents, and one molecular equivalent of an acetoacetanilide containing no water-solubilizing substituents, wherein the tetrazo compound is added to a mixture of said acetoacetanilides in an aqueous alkaline reaction mixture, and the resulting coupling reaction allowed to proceed until no free tetrazo compound remains in the reaction mixture.

6. In a process for preparing a disazo dyestuff involving coupling in aqueous alkaline medium of a member of the group consisting of tetrazotized 4,4'-diamino-3,3'-dicarboxy - diphenylurea and tetrazotized 4,4'-diamino-3,3'-dicarboxy-diphenyl-thiourea with one molecular equivalent of an acetoacetanilide containing a nuclear sulfo group but no additional water-solubilizing substituents and with one molecular equivalent of an acetoacetanilide containing no water-solubilizing substituents, and recovering the dyestuff from the reaction mixture in the form of an aqueous paste, the improvement which comprises acidifying said paste with a volatile organic acid and drying the acidified paste by heating under reduced pressure at temperatures up to 75° C.

ALBERT F. STROBEL.
WILLIAM W. WILLIAMS.

REFERENCES CITED

The following references are of record in the file of this patent:

UNITED STATES PATENTS

| Number | Name | Date |
|---|---|---|
| 946,051 | Kahn | Jan. 11, 1910 |
| 946,052 | Kahn | Jan. 11, 1910 |
| 1,078,503 | Herzberg | Nov. 11, 1913 |
| 1,851,097 | Hentrich et al. | Mar. 29, 1932 |
| 2,427,537 | Straub et al. | Sept. 16, 1947 |
| 2,476,259 | Mayer et al. | July 12, 1949 |

FOREIGN PATENTS

| Number | Country | Date |
|---|---|---|
| 215,769 | Great Britain | June 18, 1925 |
| 285,812 | Great Britain | May 15, 1929 |